United States Patent [19]

Yeh

[11] Patent Number: 5,399,641

[45] Date of Patent: Mar. 21, 1995

[54] METHOD OF CONTROLLING THE POLYMERIZATION OF ACRYLATES

[75] Inventor: Ming-Hsiung Yeh, Midland, Mich.

[73] Assignee: Dow Corning Corporation, Midland, Mich.

[21] Appl. No.: 248,970

[22] Filed: May 24, 1994

Related U.S. Application Data

[62] Division of Ser. No. 179,179, Jan. 10, 1994, Pat. No. 5,359,018.

[51] Int. Cl.6 .................................................. C08F 4/10
[52] U.S. Cl. ...................................................... 526/221
[58] Field of Search ........................................ 526/221

[56] References Cited

U.S. PATENT DOCUMENTS

| | | | |
|---|---|---|---|
| 3,100,200 | 8/1963 | Smith . | |
| 4,414,372 | 11/1983 | Farnham | 526/190 |
| 4,417,034 | 11/1983 | Webster | 526/190 |
| 4,508,880 | 4/1985 | Webster | 526/190 |
| 4,611,037 | 9/1986 | Musch et al. | 526/206 |
| 4,940,760 | 7/1990 | Boettcher et al. | 526/221 |
| 5,196,491 | 3/1993 | Cho et al. | 526/221 |

FOREIGN PATENT DOCUMENTS 1051003  2/1959  Germany ............................. 526/221

OTHER PUBLICATIONS

Polymer Letters vol. 9, pp. 97–102 (1971) "Preparation of Alternating Copolymers in the Presence of Metal Halides in an Aqueous Medium".
Macromolecules 1984, 17, 1415–1417.

*Primary Examiner*—Joseph L. Schofer
*Assistant Examiner*—N. Sarafin
*Attorney, Agent, or Firm*—Robert L. McKellar

[57] ABSTRACT

The present invention relates to a method of controlling the polymerization of acrylates using a catalyst which is selected from at least one of zinc, cadmium, or mercury halides in combination with free iodine to give acrylate polymers having narrow molecular weight distributions, via group transfer polymerization.

18 Claims, No Drawings

METHOD OF CONTROLLING THE POLYMERIZATION OF ACRYLATES

This is a divisional of application Ser. No. 08/178,179, filed on Jan. 10, 1994, now U.S. Pat. No. 5,359,018.

FIELD OF THE INVENTION

The present invention relates to a novel method of controlling the polymerization of acrylates using a novel catalyst.

Specifically, the present invention relates to a method of controlling the polymerization of acrylates using a catalyst which is selected from at least one of zinc, cadmium, or mercury halides in combination with free iodine to give acrylate polymers having narrow molecular weight distributions, via group transfer polymerization. The catalysts used in the instant invention allow for the control of the polymerization to afford such polymers.

BACKGROUND OF THE INVENTION

Group transfer polymerization of acrylates is widely recognized as being capable of producing living polymers with controlled molecular weight and narrow molecular weight distribution and there are multiple publications setting forth such methods. The method generally includes the reacting of acrylic monomers, or mixtures of them, with initiators and a catalyst to obtain living polymers.

For example, in U.S. Pat. No. 4,414,372, issued Nov. 8, 1983 to Farnham, et al, there is disclosed the primary elements of a method to produce living polymers. The catalysts set forth in that patent for use in the method include co-catalysts which are a source of bifluoride ions HF2, to produce the polymers.

Preferred are the co-catalysts which include sources of fluoride, cyanide or azide ions, those suitable being Lewis acids, for example zinc chloride, bromide or iodide, boron triflouride, alkylaluminum oxide and alkylaluminum chlorides.

Most preferred catalysts are tris(dimethylamino)sulfonium biflouride, tetraalkylammonium bifluorides, tetraarylphosphonium bifluorides, bifluorides of the alkali metals, especially potassium, and ammonium bifluoride.

Another example of disclosure of a method can be found in U.S. Pat. No. 4,417,034, which issued Nov. 22, 1983 to Webster in which living polymers and their preparation from acrylic-type or maleimide monomers and organosilicon, tin or germanium initiators is shown. The disclosure in that patent relating to catalysts is nearly analogous to that of the '372 patent and does not bear repeating herein.

There is disclosed in U.S. Pat. No. 4,508,880, which issued Apr. 2, 1985 to Webster, the further preparation of living polymers. The disclosure in this patent is identical to that of the '034 patent, as the '880 patent is a continuation of the '034 patent, and therefore, does not bear repeating herein.

The essence of the disclosures in the above mentioned patents is summarized in a publication in Macromolecules 1984, 17, 1415 to 1417. This publication is important because it sets forth the details of the catalysts-that have been found useful by the above-mentioned patentees. Thus, the article sets forth at page 1416, left hand column, at the bottom, that the catalysts have to be used at levels of about 10 to 20 mol % relative to monomer to achieve complete conversions of acrylates and methacrylates.

THE INVENTION

The present invention relates to a method of controlling the polymerization of acrylates using a novel catalyst which is selected from at least one of a zinc, cadmium, or mercury halide, in combination with free iodine to give acrylate polymers having narrow molecular weight distributions via group transfer polymerization.

More specifically, the present invention relates to a method of group transfer polymerization to produce living polymers from acrylic-type monomers and the novel catalysts.

Thus, the present invention comprises in one embodiment, a method of controlling the polymerization of acrylates, the method comprising (I) contacting an initiator, one or more acrylic monomers and, a catalyst, for a time sufficient and at a temperature sufficient to create a polyacrylate polymer selected from the group consisting essentially of polyacrylate homopolymers and polyacrylate co-polymers. The catalysts are selected from a group comprising a mixture of at least one compound selected from Zn, Cd, and Hg halides, mixed with $I_2$.

In a further embodiment, the reaction is quenched after the desired polyacrylate polymer is formed.

Further, this invention includes the novel catalysts as compositions of matter, along with the polymers that are prepared by the methods disclosed and claimed herein.

With regard to the invention herein, the term "living" polymer means a polymer of the invention which contains an active terminal group and is capable of polymerizing further in the presence of monomers and catalyst.

It has been discovered that by combining free iodine with the Lewis acid halides described above, a process is provided which gives polymers having narrow molecular weight distributions, higher molecular weights, and nearly one hundred percent of conversion of the starting monomers.

The process contemplates the contacting of the reactants, that is, a monomer, or mixture of monomers, and an initiator, with the catalyst, heating the reaction at a temperature and for a period of time to convert essentially all of the monomer to polymer.

Thus, the monomeric reactants useful in this method are those acrylate monomers which are suitable for use in this type of reaction and include, but are not limited to those set forth in the '034 patent, said patent being incorporated herein by reference for what it teaches about such monomers, it being understood by those skilled in the art that this invention does not deal with, nor include methacrylate monomers.

More specifically, the monomers include methyl acrylate; butyl acrylate; sorbyl acrylate; ethyl acrylate; propargyl acrylate; 2-(dimethylamino)ethyl acrylate; 3,3-dimethoxypropyl acrylate; 3-methacryloxypropyl acrylate; 2,2,3,3,4,4,4-heptafluorobutyl acrylate; ethyl 2-cyanoacrylate; 4-fluorophenyl acrylate; 2-methacryloxyethyl acrylate; ethyl 2-chloroacrylate; phenyl acrylate; 2{(1-propenyl)oxy}ethyl acrylate; and allyl acrylate. Preferred monomers include methyl acrylate; ethyl acrylate; butyl acrylate; sorbyl acrylate; 2-methacryloxyethyl acrylate; propargyl acrylate and neopentyl glycol diacrylate. Methyl acrylate, propargyl acrylate, and neopentyl glycol diacrylate are the most preferred.

Initiators which are useful in the inventive process herein are well-known in the art and reference can be made to several U.S. Patents for examples of such initiators, for example, U.S. Pat. Nos. 4,754,046, 5,208,358, 4,783,543, and 5,247,112, to name a few. The initiators set forth in the aforementioned U.S. patents dealing with initiators are hereby incorporated by reference to show the range and type of initiators useful in this invention.

More specifically, initiators useful in this invention include silanes such as {(1-methoxy-2-methyl-1-propenyl)oxy}trimethyl-silane; 2-(trimethylsilyl)isobutyronitrile; ethyl 2-(trimethylsilyl) acetate; trimethylsilyl nitrile; ((4,5-dihydro-2-2-furanyl)oxy}trimethylsilane; {(2-methyl-1-propenylidene)bis(oxy)} bis{trimethylsilane}; {(2-methyl-1-{2-(methoxymethoxy)ethoxy}-1-propenyl)oxy}trimethylsilane; methyl{(2-methyl-1-(trimethylsilyloxy)-1-propenyl)oxy}acetate, and the like.

The ratio of the initiator to the monomer will determine the molecular weight of the polymer. Low levels of initiator give higher molecular weights. Too much initiator will give mostly oligomeric materials. Thus, the initiator is employed at a concentration such that the monomer to initiator molar ratio is greater than 10, preferably greater than 100.

The monomers and initiators useful in this process are generally liquids and can be polymerized without a solvent, although a solvent is beneficial in controlling temperature during exothermic polymerization which is common with this type of reaction. A solvent has been found useful in the method of this invention and suitable solvents are aprotic liquids in which the monomer, initiator and catalyst are sufficiently soluble for the reaction to occur. Thus, such solvents include toluene, xylene, the so-called crown ethers, acetonitrile, tetrahydrofuran, ethyl acetate, propionitrile, bromobenzene, dimethoxyethane, diethoxyethane, diethylether, tetramethylenesulfone, N,N-dimethylformamide, N,N-dimethylacetamide, N-methylpyrrolidone, anisole, 2-butoxyethoxytrimethylsilane, other low boiling silanes, and the like. Preferred are toluene and xylene.

When a solvent is used, the monomer may be dissolved therein at concentrations of at least five (5) weight percent, preferably at least fifty (50) weight percent.

The time that the reaction can be run varies from a few minutes to a few days, depending on the temperature at which the reaction is carried out. The reaction is normally carried out within a few hours and quite often, the reaction is essentially complete in minutes. The temperature range for the reaction of this method is 0° to 80° C. Preferred is a temperature range of to 25° C. to 40° C.

The catalyst, which is the essential feature of this invention, is formed from halides of zinc, cadmium, or mercury. Preferred for this invention are the iodides and bromides and most preferred are the iodides. It is essential for the halides of this invention to be combined with free iodine, i.e. $I_2$ in order to form the catalyst of this invention. It is contemplated within the scope of this invention to use mixed halides with the iodine. The useful molar ratio of zinc, cadmium, or mercury halide to $I_2$ is on the order of at least 1.25:1 to less than 19:1. However, it is preferred that the ratio be less than 15 to 1. Most preferred for this invention is the combination of zinc iodide with free iodine in a ratio of 10 to 1.

The catalyst is normally present in such an amount that the molar ratio of monomer to catalyst is in the range of 0.04 parts of catalyst to 100 parts of monomer, and is preferably in the range of 0.08 or higher, to 100 parts of monomer.

The order of addition of the monomers, initiator and catalyst is critical for this invention. For example, one should not add the $I_2$ to the initiator because they react with each other in the absence of metal halide. This, of course deactivates the initiator. More specifically, initiator can be decomposed by $I_2$ in the absence of metal halide. Thus, the preferred method is the addition of the initiator as quickly as is possible to a combination of the monomers and catalyst in the reaction vessel.

The solvent, if used, can be added at any stage, but is preferably added at the beginning of the reaction, before any addition of initiator takes place.

Upon determining that the reaction has essentially been completed, for example, by showing the absence of any monomer in the reaction mass, the reaction can be stopped, i.e. quenched, by the addition of any active hydrogen source such as water, or alcohol. Preferred for this invention are lower alcohols such as methyl, ethyl, propyl, butyl, amyl, and the like, and most preferred is methyl alcohol.

This invention is useful for preparing homopolymers or copolymers of the monomers described above. With this invention, it is possible to create variation in polymer physical properties, such as glass transition temperature, hardness, heat distortion temperature, and melt viscosity.

The process of this invention can be used to prepare polymers containing one or more specifically located functional groups which are useful for subsequent preparation of block copolymers or crosslinked polymers and the details of such materials as found in U.S. Pat. No. 4,417,034 is incorporated herein by reference for what it teaches about those materials.

Now so that those skilled in the art can appreciate the scope and value of the invention the following examples are provided.

EXAMPLE 1

Preparation of a Polymer by the Method of This Invention

This example illustrates the molecular weight distribution of the polymers prepared by one embodiment of the instant invention.

A catalyst was made by mixing 10 weight parts of $ZnI_2$ with one weight part of iodine. To a glass, round-bottomed, three-necked flask, equipped with a magnetic stirrer was loaded 0.02 grams of the catalyst, 20 grams of methyl acrylate, and 20 grams of toluene. The mixture was purple in color at this point. The flask was cooled in a water bath. Upon stirring, 1.0 gram of

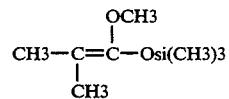

addition. The purple color disappeared immediately after the introduction of the silane. After a very short induction period, an exothermic reaction was observed by touching the flask. The mixture was allowed to stir at room temperature overnight and then quenched with methanol. As methanol was added, a brownish purple color reappeared. The product mixture was washed with ten percent sodium thiosulfate twice, followed by water twice, then dried over sodium sulfate. Toluene and other volatiles, if any, were removed under reduced pressure to obtain a slightly yellowish viscous, clear polymer. GPC analysis with THF as the mobile phase (0.35 weight percent/volume) and polystyrene as the Standard gave the molecular weight data found in Table I.

TABLE I

| RESULTS OF GPC ANALYSIS | |
|---|---|
| Mn = 8825 | Mw/Mn = 1.052 |
| Mw = 9286 | Mz/Mw = 1.045 |
| Mz = 9701 | Mz/Mn = 1.099 |

EXAMPLE 2

A second polymer was made by making a catalyst by mixing nine weight parts of $ZnI_2$ with one weight part of iodine. To a flask equipped as set forth above, was added 0.02 grams of the catalyst, 2.0 grams of methyl acrylate, and 20 grams of toluene. The mixture was purple in color. Upon stirring at room temperature, the silane as was used in example 1 was added at a 1.0 gram level. The purple color disappeared immediately after the introduction of the silane. To the reaction flask was then added 2.5 grams of propargyl acrylate, followed by 18.0 grams of methyl acrylate. The reaction mixture became warm (about 45° C.). The mixture was allowed to stir at room temperature overnight (about 16 hrs.) and then quenched with methanol. Toluene, and other volatiles if any, were removed under reduced pressure to obtain a viscous, clear polymer. GPC analysis with THF as the mobile phase (0.25 weight percent/volume) and polystyrene as the Standard gave the following molecular weight data.

TABLE II

| RESULTS OF GPC ANALYSIS | |
|---|---|
| Mn = 10720 | Mw/Mn = 1.197 |
| Mw = 12830 | Mz/Mw = 1.145 |
| Mz = 14690 | Mz/Mn = 1.371 |

An IR spectrum showed the polymer contained functional groups of C=O (1787 CM-1) and a carbon to carbon triple bond (2133 cm-1). No carbon to carbon double bond signal for the acrylic functionality was observed by IR.

EXAMPLE 3

Several runs were carried out to examine several variables by essentially the procedure as set forth above in examples 1 and 2.

Table III has the results of the runs.

EXAMPLE 4

Criticality of not adding I2 to the Initiator.

(Treatment of sample 2 of this example falls outside of the scope of this invention.)

A reaction was carried out using the material of sample 1 wherein, it will be noted, there was no free iodine present in the catalyst. This sample was subjected to 10 minutes of aging, and then 0.4 parts of free iodine was added to the mixture. Before the addition of the iodine, and during the aging period, there was no reaction. However, upon the addition of the free iodine, the material instantly polymerized.

Sample 2, having no $ZnI_2$, was aged for 10 minutes in the presence of the free iodine and then 2 parts of $ZnI_2$ was added. There was no reaction within a thirty minute time period. It is believed that the contact of the free iodine with the initiator in the reactants deactivated the initiator.

TABLE III

| | | RESULTS OF VARIABLES EXAMINATION | | | |
|---|---|---|---|---|---|
| SAMPLE NUMBER | AMT.OF MI2/I2 | RATIO X:1 | CATALYST/100 PARTS MONOMER | MONOMER TYPE* | OBSERVATION |
| 1 | 2/0 | 0 | 2.0 | NPGDA | No react./10min. |
| 2 | 0/0.8 | 0 | .8 | NPGDA | No react./10 min. |
| 3* | 0.191/0.01 | 19 | 0.2 | NPGDA | No react./48 hr. |
| 4 | 1.8/0.2 | 9 | 2.0 | NPGDA | Instant polymer. |
| 5 | 1.8/0.2 | 9 | 2.0 | MA | Instant polymer. |
| 6 | 0.033/0.007 | 4.7 | 0.0 | NPGDA | Polymerize/2–4 hr |
| 7 | 0.164/0.036 | 4.6 | 0.2 | " | Instant polymer. |
| 8 | 0.030/0.010 | 3 | 0.0 | " | Polymeriz./2–4 hr |
| 9 | 0.149/0.057 | 2.9 | 0.2 | " | Instant polymer. |
| 10 | 0.029/0.011 | 2.6 | 0.0 | " | Polymeriz./2–16 hr |
| 11 | 0.143/0.057 | 2.5 | 0.2 | " | Instant polymer. |
| 12 | 0.027/0.013 | 2.1 | 0.0 | " | Polymeriz./2–4 hr |
| 13 | 0.134/0.066 | 2.0 | .2 | " | Instant polymer. |
| 14 | 0.111/0.089 | 1.25 | 0.2 | " | Instant polymer. |
| 15 | 0.022/0.018 | 1.22 | 0.0 | " | No react./48 hr. |

*NPDGA is Neopentyl glycol Diacrylate MA is methyl acrylate

EXAMPLE 5

A reaction was carried out at room temperature using 100 grams of neopentyl glycol diacrylate, 5 grams of the initiator of example 1, and 0.9 grams of ZnBr2/I2 in the ratio of 1.25:1. The reactants polymerized, but slower than those of examples 1 and 2.

EXAMPLE 6

A reaction was carried out at room temperature using 100 grams of neopentyl glycol diacrylate, 5 grams of the initiator of example 1, and 1.0 gram of HgBr2/I2 in the ratio of 1.56:1. The reactants polymerized, but slower than those of examples 1 and 2.

That which is claimed is:

1. A method of controlling the polymerization of acrylates, said method comprising
   (I) contacting and reacting
      A. an initiator and
      B. one or more acrylic monomers in the presence of
      C. a catalyst, for a time sufficient and at a temperature sufficient to create a polyacrylate polymer selected from the group consisting essentially of
  i polyacrylate homopolymers and
  ii polyacrylate co-polymers, said catalyst being a mixture of at least one metal halide compound selected from Zn, Cd and Hg halides, mixed with $I_2$.

2. A method as claimed in claim 1 wherein the molar ratio of monomer to initiator is greater than 10.

3. A method as claimed in claim 2 wherein the molar ratio of monomer to initiator is greater than 100.

4. A method as claimed in claim 1 wherein there is additionally present a solvent.

5. A method as claimed in claim 4 wherein the solvent comprises 95 weight percent or less of the total mixture.

6. A method as claimed in claim 5 wherein the solvent comprises 50 weight percent or less of the total mixture.

7. A method as claimed in claim 1 wherein the time of reaction is in the range of 0.25 hours to 48 hours.

8. A method as claimed in claim 7 wherein the time of reaction is in the range of 1 to 12 hours.

9. A method as claimed in claim 1 wherein the temperature is in the range of 0° C. to 80° C.

10. A method as claimed in claim 9 wherein the temperature is in the range of 25° C. to 40° C.

11. A method as claimed in claim 1 in which the ratio of the total metal halide catalyst to free iodine in the reaction is less than 15:1.

12. A method as claimed in claim 11 in which the ratio of the total metal halide catalyst to free iodine in the reaction is about 10:1.

13. A method as claimed in claim 1 in which the catalyst is present in the reaction in the range of 0.04 to 2 parts, based on 100 parts of monomer in the reaction.

14. A method as claimed in claim 13 in which the catalyst is present in the reaction in the range of 0.08 to 1 parts, based on 100 parts of monomer in the reaction.

15. A method as claimed in claim 14 in which the catalyst is present in the reaction in the range of 0.10 to 0.50 parts, based on 100 parts of monomer in the reaction.

16. A method as claimed in claim 1 wherein the acrylic monomer is methyl acrylate.

17. A method as claimed in claim 1 wherein the acrylic monomer is neopentyl glycol diacrylate.

18. A method as claimed in claim 1 wherein component B. is a mixture of acrylate monomers.

* * * * *